(12) United States Patent
Reguzzi (10) Patent No.: US 6,609,861 B2
(45) Date of Patent: Aug. 26, 2003

(54) DRILLING APPARATUS FOR PANELS

(76) Inventor: Luigi Reguzzi, Via Kennedy 33/41, Mariano Comense (IT)

(*) Notice: Subject to any disclaimer, the term of this patent is extended or adjusted under 35 U.S.C. 154(b) by 82 days.

(21) Appl. No.: 09/876,558

(22) Filed: Jun. 7, 2001

(65) Prior Publication Data

US 2002/0001511 A1 Jan. 3, 2002

(30) Foreign Application Priority Data

Jul. 3, 2000 (IT) ...................................... MI2000A1496

(51) Int. Cl.$^7$ .............................................. B23B 39/00
(52) U.S. Cl. ........................ 408/35; 408/103; 408/234
(58) Field of Search .......................... 408/35, 103, 234, 408/109

(56) References Cited

U.S. PATENT DOCUMENTS 6,158,666 A * 12/2000 Banks et al.
6,390,900 B1 * 5/2002 Susnjara

* cited by examiner

*Primary Examiner*—William M. Pierce
(74) *Attorney, Agent, or Firm*—Hedman & Costigan, P.C.

(57) ABSTRACT

A drilling apparatus for panels of wood, plastics, aluminium or the like, comprises conveyor means for conveying a panel to be processed along a horizontal axis x, in an intermittent manner, to locate the panel at a tool bearing rotary turret, and being characterized in that the apparatus further comprises top horizontal guide means, vertically arranged along an axis y; abutment means at the horizontal guide means, and suitable to translate along an axis z to fit their position to the thickness of the panel being processed; holding means applied to vertical uprights and suitable to form a fixed support wall for the panel being processed, bottom guide means adapted to translate along the axis z, independently from the horizontal guide means, and which can be adjusted depending on the thickness of the panel, which can be different at different regions of the panel itself.

9 Claims, 8 Drawing Sheets

DRILLING APPARATUS FOR PANELS

BACKGROUND OF THE INVENTION

The present invention relates to a drilling apparatus for drilling panels or boards made of wood, plastics, aluminium or the like materials.

These panels have a parallelepipedal configuration, and must be subjected to a plurality of drilling operations, to provide a corresponding plurality of spaced holes or perforations, to connect a panel to other elements for forming, for example, a furniture piece, an equipped wall or other like construction.

SUMMARY OF THE INVENTION

The aim of the invention is to provide such a drilling apparatus for drilling panels made of wood, plastics, aluminium, or the like materials, adapted to allow a panel to be processed to be accurately located, in a very quick manner.

Within the scope of the above mentioned aim, a main object of the present invention is to provide such a drilling apparatus for drilling panels made of wood, plastics, aluminium, or the like materials, which is suitable to carry out very accurate processing operations, in a very short time.

Yet another object of the present invention is to provide such a panel drilling apparatus which is very reliable in operation.

According to one aspect of the present invention, the above mentioned aim and objects, as well as yet other objects, which will become more apparent hereinafter, are achieved by a drilling apparatus for drilling panels made of wood, plastics, aluminium or the like materials, comprising conveyor means for conveying a panel to be processed along a horizontal axis x, in an intermittent manner so as to locate said panel at a tool bearing rotary turret, and being characterized in that said apparatus further comprises: top horizontal guide means, vertically movable along an axis y; abutment means, at said horizontal guide means, and suitable to translate along an axis z, to fit their position to a thickness of the panel being processed; holding means applied to vertical uprights and suitable to form a fixed support wall for the panel being processed, bottom guide means suitable to translate along said axis z, independently from said horizontal guide means, and suitable to be adjusted depending on the thickness of said panel, which thickness can vary through different zones of said panel.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative, but not limitative, example in the accompanying drawings, where.

DESCRIPTION OF THE PREFERRED EMBODIMENTS

Figure 1:
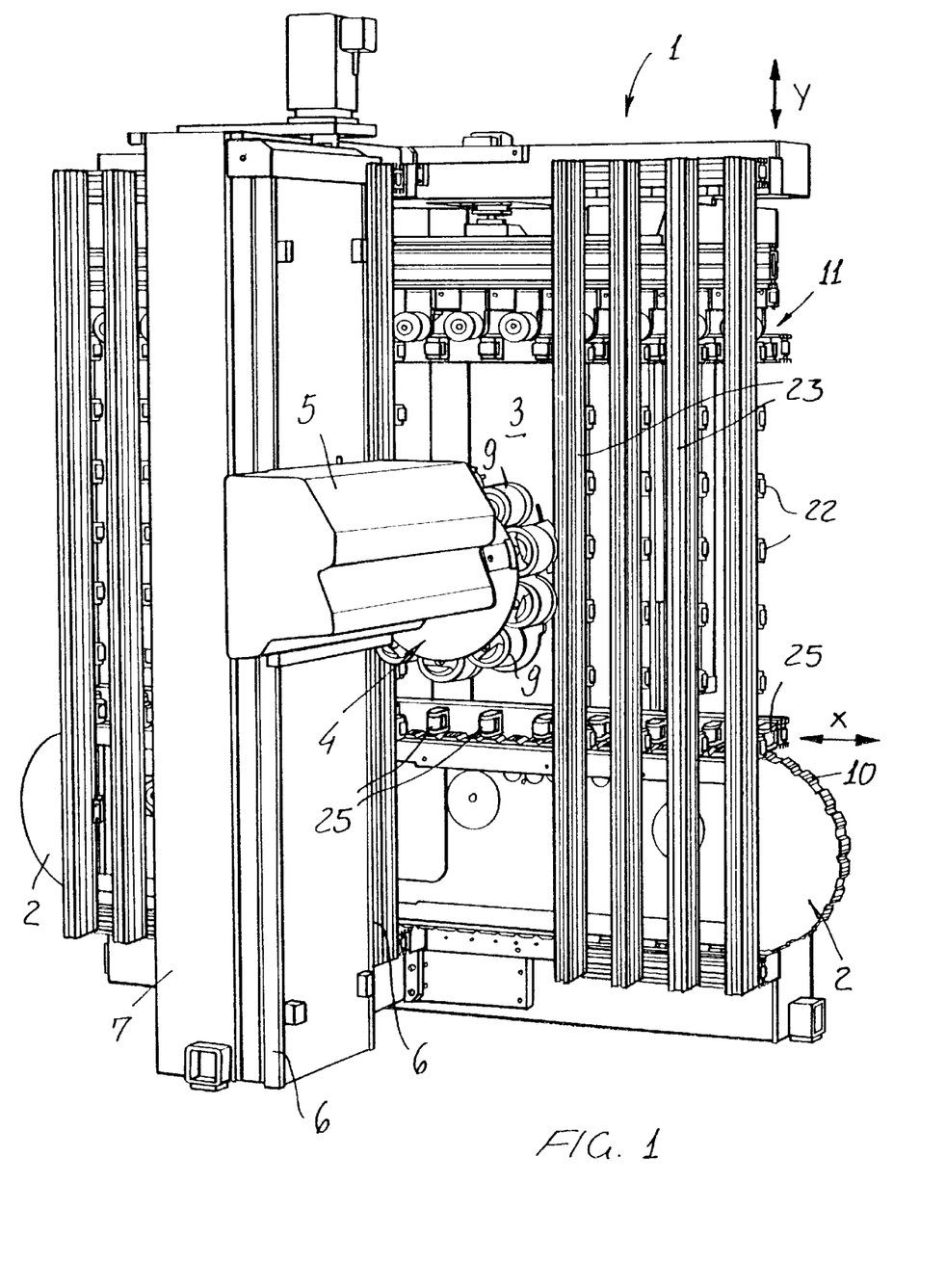
FIG. 1 is a front perspective view of the apparatus according to the present invention.
Figure 2:
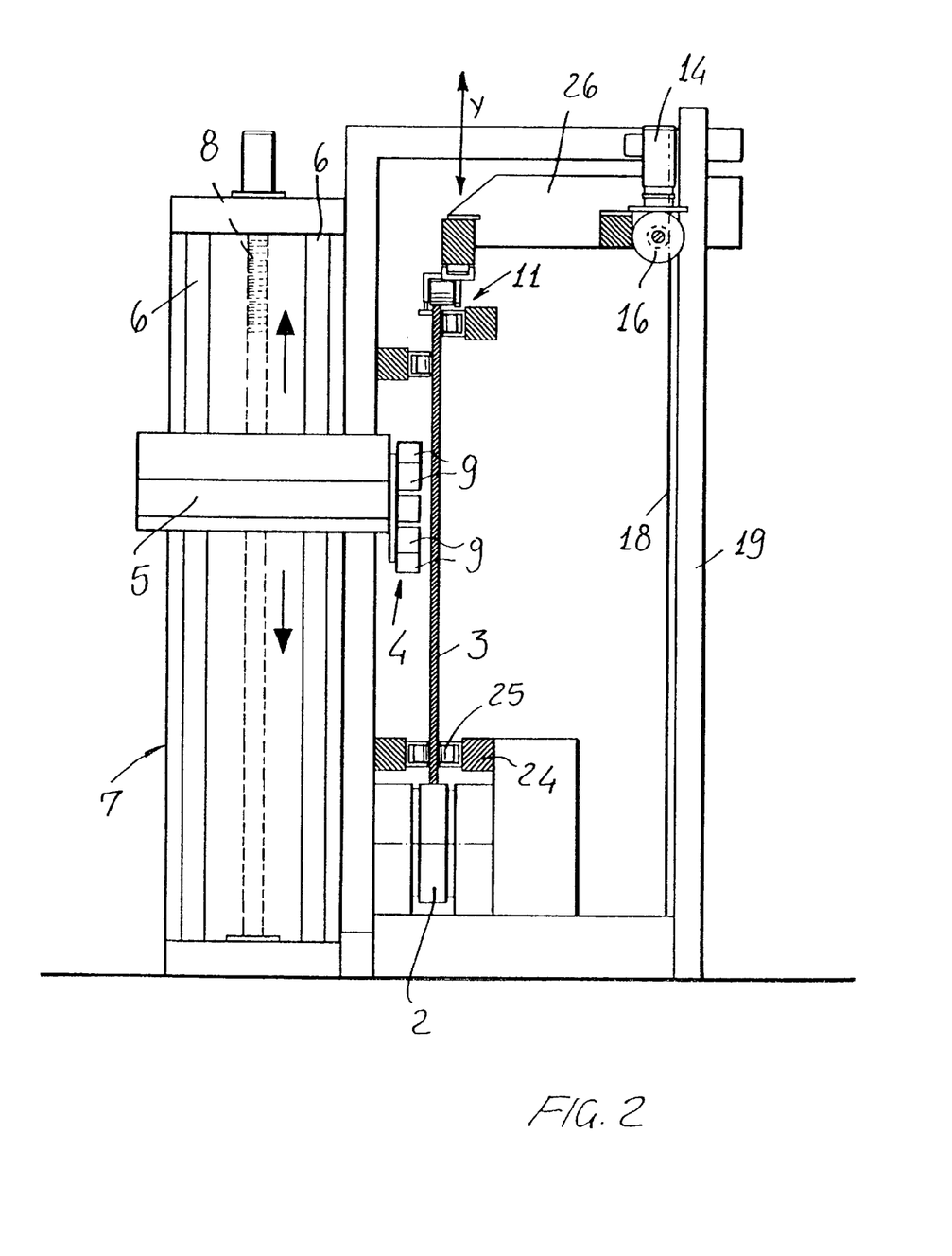
FIG. 2 is a side elevation view of the apparatus according to the invention.
Figure 3:
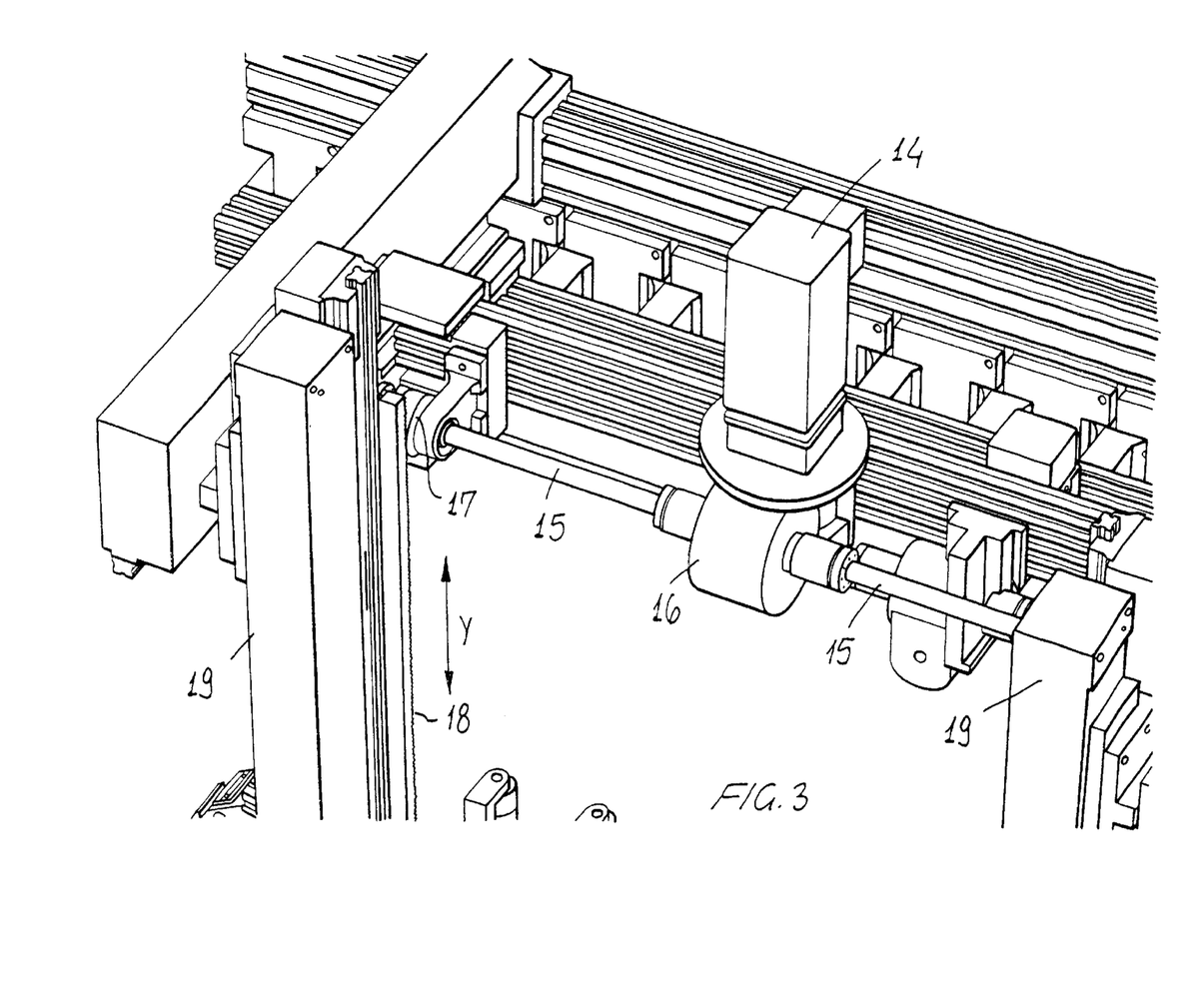
FIG. 3 is a perspective view, on an enlarged scale, of a detail of the apparatus according to the invention.
Figure 4:
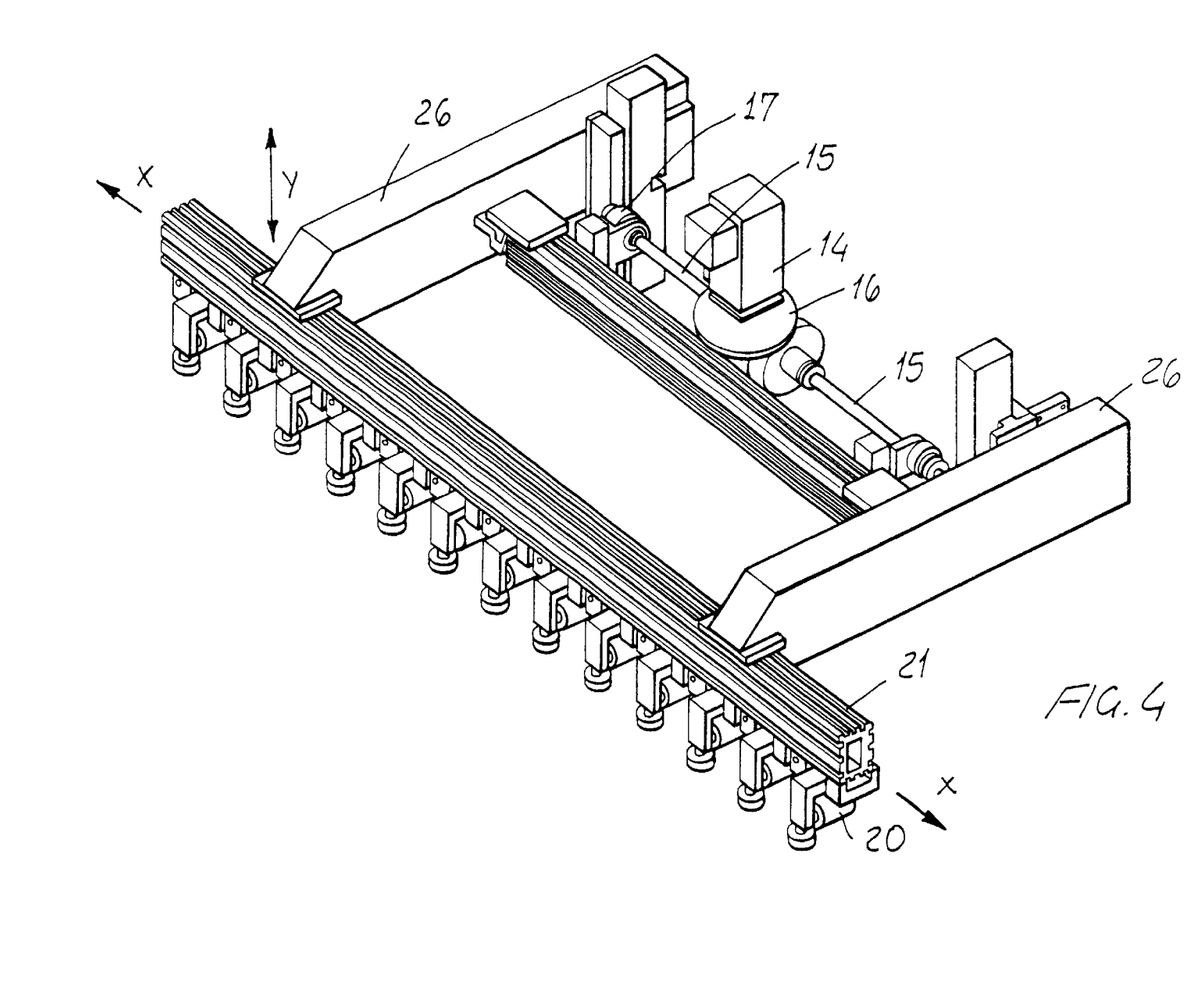
FIG. 4 is a top partial perspective view of the apparatus according to the invention.
Figure 5:
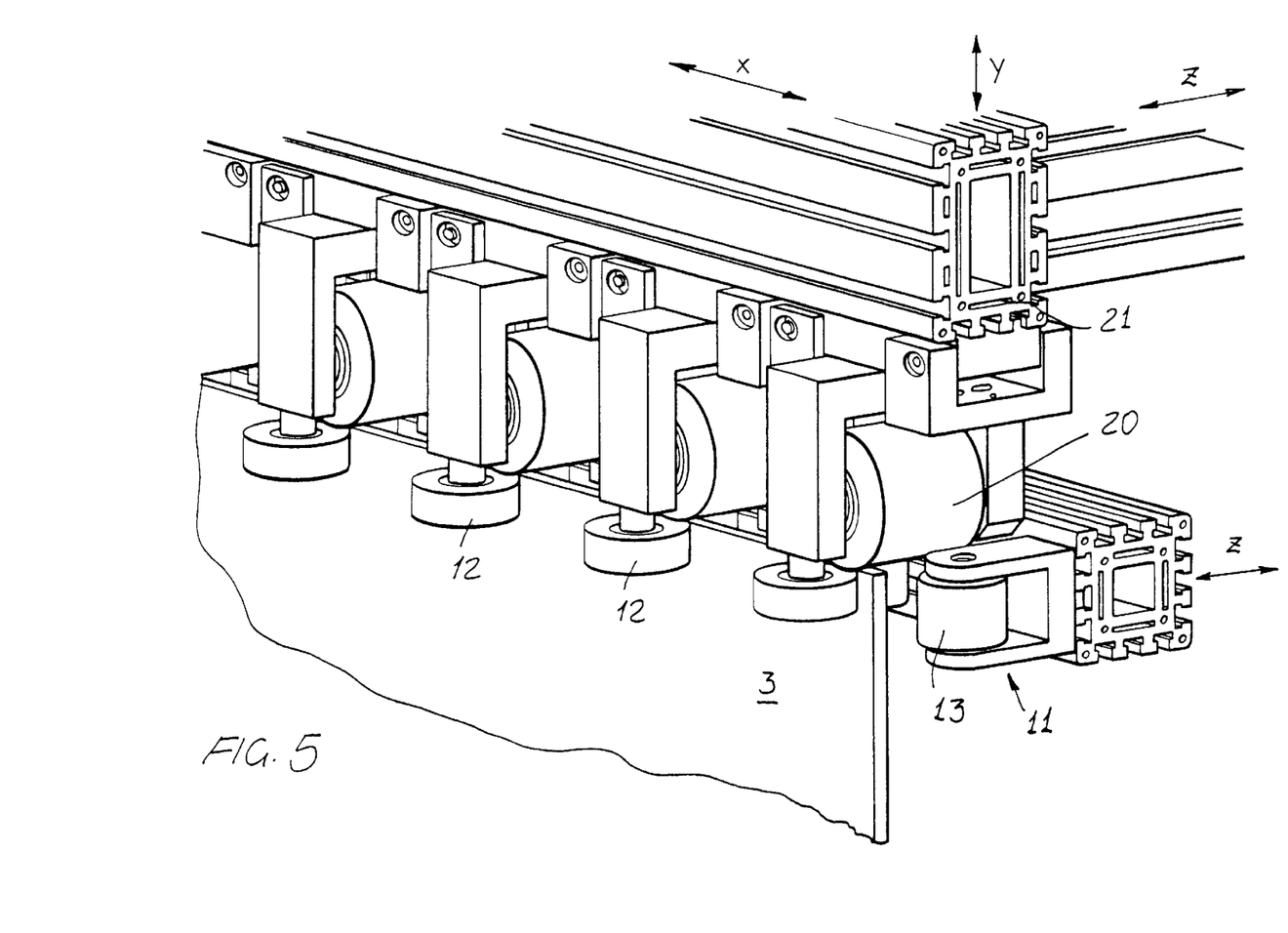
FIG. 5 is a perspective view, on an enlarged scale, of a further detail of the apparatus according to the invention.
Figure 6:
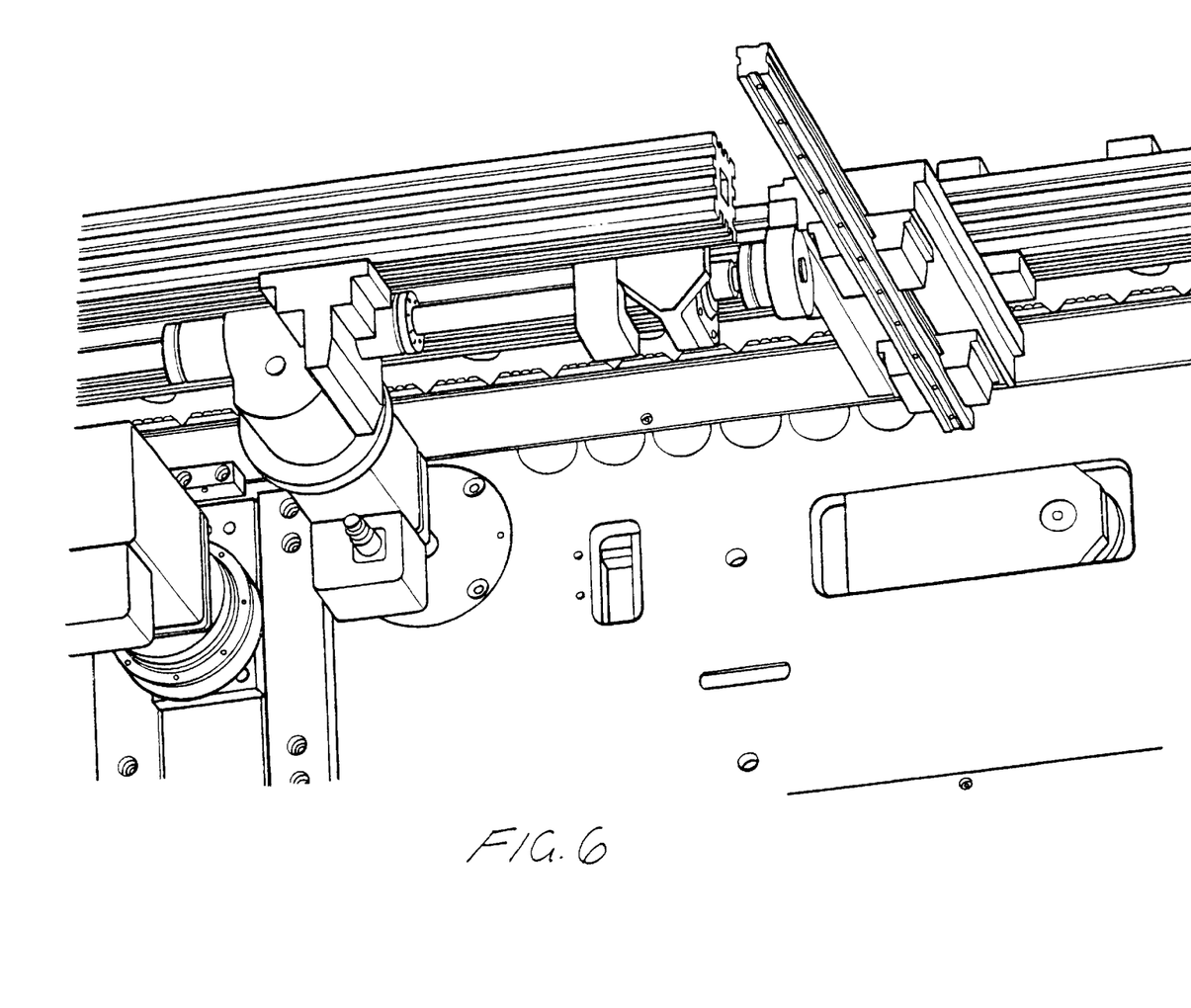
FIG. 6 is a perspective view, on an enlarged scale, of a detail of the apparatus according to the invention.
Figure 7:
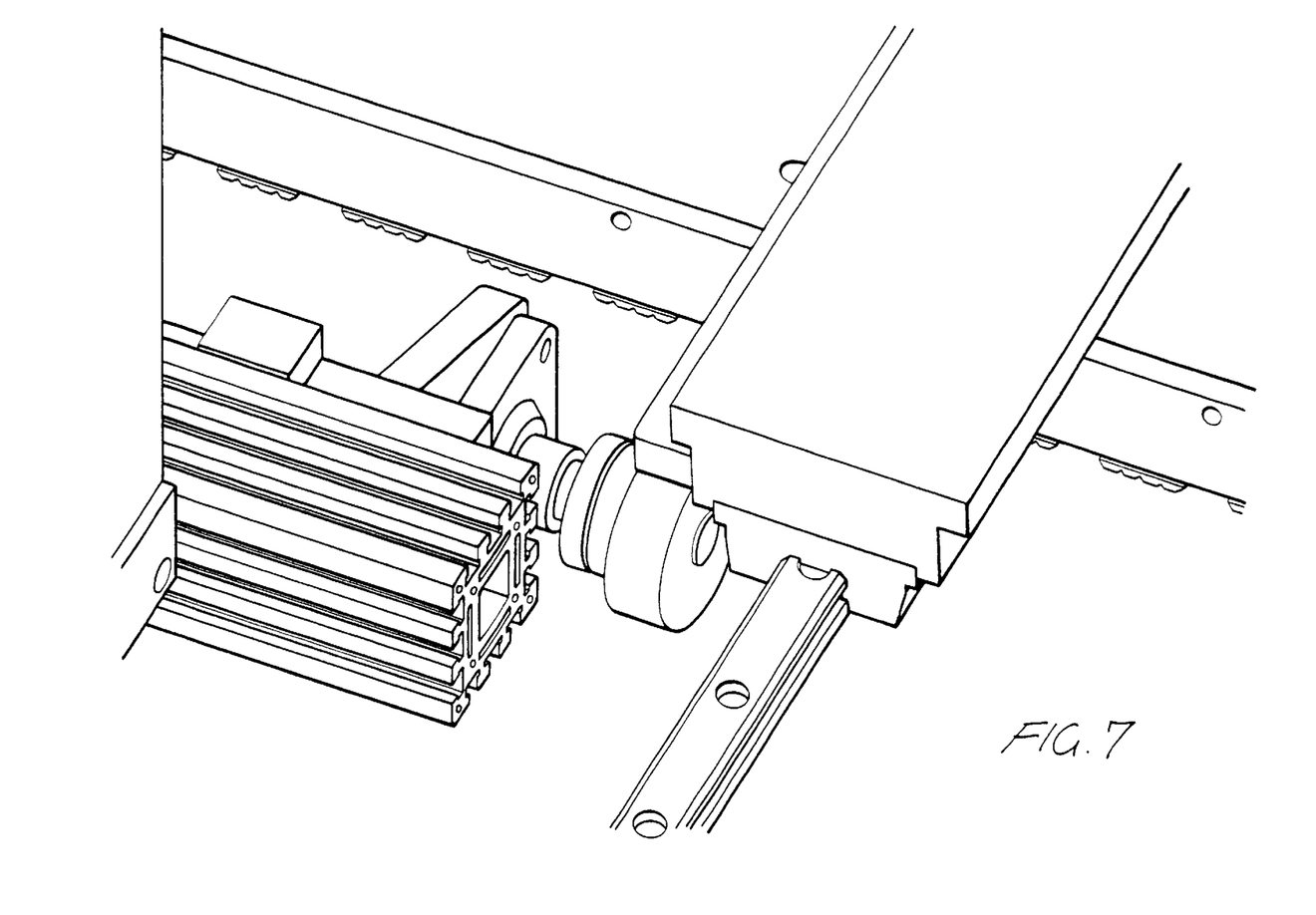
FIG. 7 is a perspective view, on an enlarged scale, of a further detail of the apparatus according to the invention.
Figure 8:
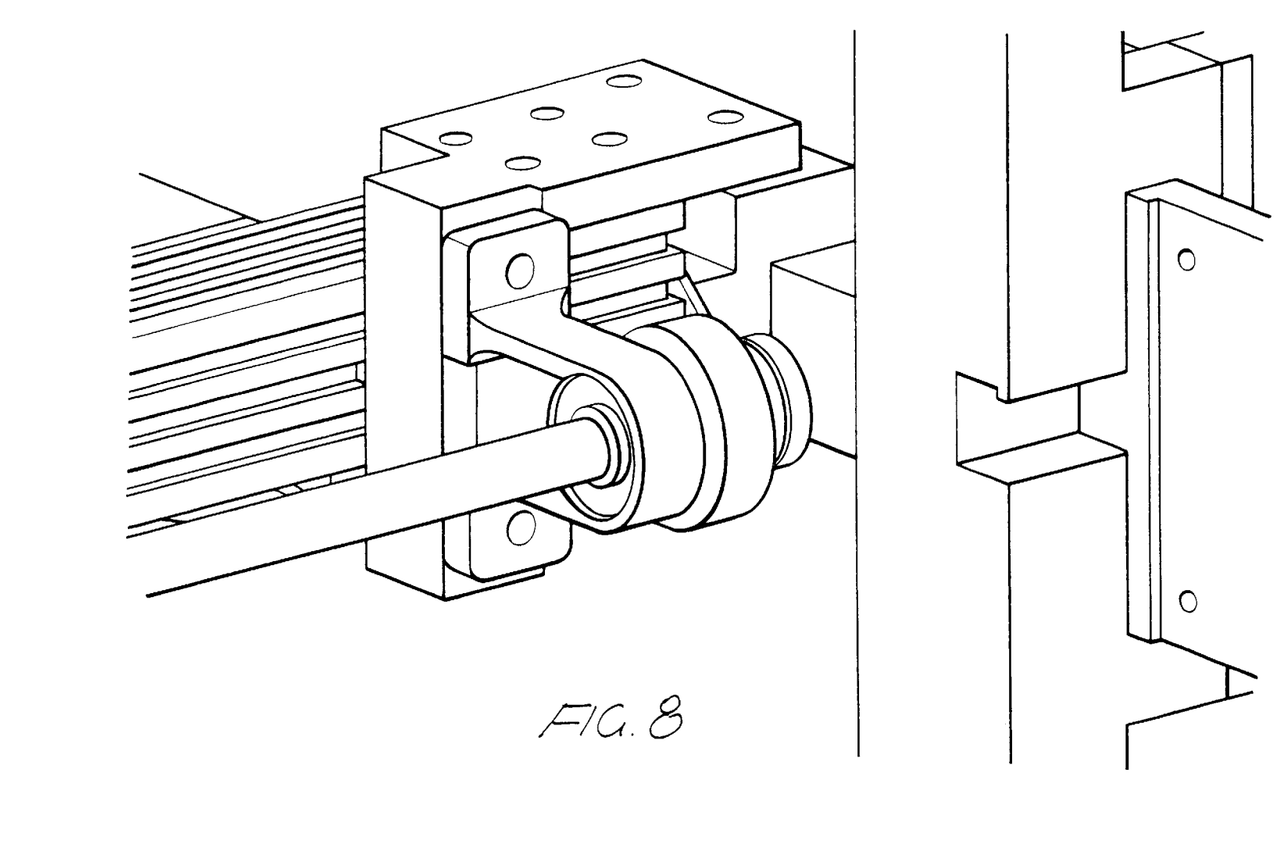
FIG. 8 is a perspective view, on an enlarged scale, of a further detail of the apparatus according to the invention.

With reference to the number references of the above mentioned figures, the drilling apparatus for drilling panels, according to the present invention, which has been generally indicated by the reference number 1, comprises conveyor means 2 for conveying a panel 3 to be drilled along a horizontal axis x, in an intermittent manner, so as to precisely locate said panel at a tool bearing rotary turret 4.

Said turret 4 is supported on a support 5, which is vertically movable along vertical guides 6, formed on an upright 7, said support being driven by a ball screw system 8, causing a vertical displacement of said turret 4.

On the head of said turret 4 are mounted a plurality of head assemblies 9 including either single or multiple mandrels, for performing on the panel 3 the provided processing operations.

Said turret 4 can be turned in a very quick manner.

In fact, each full revolution of said turret is performed in a time of 1 sec and 4/10.

This quick rotary movement is driven by a brushless motor and an epicycloidal reducing unit.

This quick turning revolution of the turret is possible since the head assemblies 9 are coupled to the rotary drum through ball recirculating shoes or runners which are connected on the drum and since the guide wall axially sliding on the guide shoes is coupled to each said head assembly.

The panel 3 is held in a vertical position and is supported by said conveyor means 2, comprising the precisely fed conveyor belt 10, and being guided at the top thereof by top horizontal guide means 11, including two series of rollers 12 and 20 having respectively a vertical axis and a horizontal axis, and which can be vertically driven along an axis y by respective brushless motors.

A first brushless motor 14 vertically drives, in a perfect parallel relationship, the rollers 12 and 20 through opposite shafts 15, in turn driven by a motor-reducing assembly 16 and coupled, at their two opposite end portions, to two gears 17, each meshing with a respective vertical rack 18 coupled to a respective column 19 constituting a portion of the apparatus bearing framework.

Abutment or counter-biassing vertical axis rollers 13 are supported by a section-member 21 which can be driven along an axis z by driving kinematic assemblies similar to those above disclosed, to fit the positions of the abutment rollers 13 to the thickness of the panel 3 being processed.

To that end, bottom holding wheels 22 are provided, in addition to said conveyor belt 10, which are applied to a series of vertical uprights 23, forming a fixed support wall for the panel being processed 3.

At the bottom is provided a cross-member 24 supporting a plurality of guide rollers 25, and which can be adjusted depending on the thickness of the panel 3, which can be different through different regions of said panel.

The assembly including the two horizontal arms 26, which support the section member 21 bearing the rollers 12 and 20, is in turn supported by two rod-less cylinders, held in said columns 19, and pneumatically driven so as to compensate for the weight of said assembly in order to allow said assembly to be vertically driven with a high speed, up to 60 m per minute, in the disclosed embodiment.

The above mentioned pneumatic system for pneumatically compensating for the weight of the assembly is used for the support 5 of the turret 4, which turret can be accordingly vertically driven with a very high speed.

It has been found that the invention fully achieves the intended aim and objects.

In fact, the drilling apparatus according to the present invention can drive with a very high speed, in the vertical and horizontal direction, the clamping means for clamping the panel and, accordingly, can perform very accurate processing operations, in a very quick manner.

Another advantage of the apparatus according to the invention is that it allows the panel clamping or gripping means to be driven with a very high speed, both vertically and horizontally.

A further advantage of the apparatus according to the invention is that it comprises adjusting systems for adjusting, in a differentiated manner, the thickness of the panels being processed, so as to properly accurately and quickly locate the panels, even if said panels have different thicknesses through different regions thereof.

Yet another important advantage of the apparatus according to the present invention consists of the disclosed system for turning the apparatus head and for latching or locking it to the central mandrel.

In practicing the invention, the used materials, as well as the contingent size and shapes, can be any, depending on requirements and the status of the art.

What is claimed is:

1. A drilling apparatus for drilling a panel made of wood, plastic, aluminum and like materials, comprising in combination a tool bearing rotary turret, conveyor means for conveying axis x, in an intermittent manner so as to locate said panel at said tool bearing rotary turret, said panel having a variable thickness, top horizontal guide means, vertically movable along an axis y; abutment means, at said horizontal guide means, suitable to translate along an axis z to fit said thickness of said panel; vertical uprights having holding means forming a fixed support wall for said panel, bottom guide means suitable to translate along said axis z, independently from said horizontal guide means, said bottom guide means being adjustable to accommodate said thickness of said panel.

2. A drilling apparatus, according to claim 1, wherein said turret is supported on a support which is vertically movable along vertical guides formed on an upright, said support being driven by a ball recirculation screw, to vertically drive said turret, said support being supported by a pneumatic weight compensating system for vertically driving said turret.

3. A drilling apparatus, according to claim 1, wherein said turret comprises a turret head on which are supported a plurality of head assemblies including either single or multiple mandrels for performing a plurality of processing operations on said panel, said turret being rotatively driven by a brushless motor and an epicycloidal reducing unit, and said head assemblies being coupled to a rotary drum through ball recirculation shoes coupled to said drum and a guide wall coupled to said turret head which axially slides on said shoe.

4. A drilling apparatus according to claim 1 wherein said panel is held at a vertical position and is supported by said conveyor means which comprise a precisely fed conveyor belt, said panel being guided at a top surface thereof by top horizontal guide means including two series of rollers, respectively having a vertical axis and a horizontal axis, said rollers being driven vertically by brushless motors along an axis y.

5. A drilling apparatus, according to claim 4, wherein a first brushless motor vertically drives, in a parallel relationship, said rollers through opposite shafts which are driven by a motor reducing unit and having two opposite end portions coupled to two gears each meshing with a respective vertical rack coupled to a respective column included in a bearing framework of said apparatus.

6. A drilling apparatus, according to claim 5, wherein a series of said rollers comprises abutment rollers, of vertical axis, which are supported by a section member which can be driven along an axis z by kinematic driving assemblies, to fit a position of said abutment rollers to said thickness of said panel.

7. A drilling apparatus, according to claim 1, wherein said drilling apparatus further comprises a plurality of holding bottom wheels coupled to a plurality of vertical uprights, forming a fixed support wall for supporting said panel.

8. A drilling apparatus, according to claim 1 wherein said drilling apparatus further comprises, at a bottom thereof, a horizontal cross-member having guide rollers which can be adjusted depending on said thickness of said panel.

9. A drilling apparatus, according to claim 1, wherein said drilling apparatus further comprises an assembly including two horizontal arms supporting a section member bearing said rollers, and being supported by two rodless cylinders held in said columns, and pneumatically supplied, to compensate for a weight of said offset assembly, to vertically drive said assembly with a high speed.

* * * * *